United States Patent [19]

Bihler

[11] Patent Number: 5,113,408
[45] Date of Patent: May 12, 1992

[54] LASER

[76] Inventor: Otto Bihler, Schleiferweg 2, 8959 Halblech, Fed. Rep. of Germany

[21] Appl. No.: 611,986

[22] Filed: Nov. 8, 1990

[30] Foreign Application Priority Data

Nov. 9, 1989 [DE] Fed. Rep. of Germany ....... 3937370

[51] Int. Cl.⁵ ............................................. H01S 3/081
[52] U.S. Cl. ......................................... 372/93; 372/99; 372/34; 372/58
[58] Field of Search .................. 372/92, 93, 97, 94

[56] References Cited

U.S. PATENT DOCUMENTS

| | | | |
|---|---|---|---|
| 4,425,648 | 1/1984 | Holly | 372/93 |
| 4,669,088 | 5/1987 | Waite | 372/99 |
| 4,779,286 | 10/1988 | Wheatley | 372/93 |
| 4,783,789 | 11/1988 | Higgins | 372/94 |

Primary Examiner—Leon Scott, Jr.
Attorney, Agent, or Firm—Brumbaugh, Graves, Donohue & Raymond

[57] ABSTRACT

A laser (2e), particularly a $CO_2$ gas laser, is described which has a stimulating path supported on a common carrier (74e) and sub-divided into a plurality of partial paths. The partial paths (46) extend solely radially in relation to a common center (6e) and are connected to one another optically in pairs via deflecting mirrors (10e) and optical connecting paths (12e) between the deflecting mirrors (10e) at their radially outer ends. The laser (2e) is of very compact construction, has a high output and functions very reliably. Heat expansions of component of the resonator beam extend substantially radially of the center (6e) and do not result in maladjustment of the resonator beam.

26 Claims, 6 Drawing Sheets

LASER

BACKGROUND OF THE INVENTION

The invention relates to a laser having a stimulation path which is sub-divided into a plurality of partial paths and having a plurality of optical connecting paths connecting the partial paths to one another, possibly via deflecting mirrors.

The invention relates particularly to heavy-duty lasers for industrial applications, for example for the welding and cutting of metal. For the high level of light amplification in the laser resonator and thus the high laser output required for these purposes, long stimulation paths are required along which the laser medium is exposed to the stimulation energy of a stimulation energy source while the laser beam within the resonator is able to interact with the laser medium.

Long rectilinear stimulation paths require a generally undesirably long overall length of the laser and considerable outlay in order to provide mechanical stability.

In order to avoid long rectilinear stimulation paths, there has been a tendency to use deflector mirrors to 'fold' the resonator beam, in order to sub-divide the stimulation path into a series of partial paths. These partial paths can be accommodated in a comparatively small space. In the case of the prior art fold patterns, such as the Z-fold or the U-fold where the resonator beam is folded to a Z- or a U-shape, for example in a cylindrical or rectangular body, the problem arises that the stimulation paths which act as heat sources when the laser is operating and which are sub-divided according to these fold patterns give rise to a complicated anisotropic distribution of temperature within the laser and which can in turn bring about highly anisotropic heat expansion in partial path components or carrier and housing parts. Such heat expansions which are marked in varying extents in different directions can easily lead to a self-maladjustment of the resonator beam so that the laser no longer functions reliably. This problem occurs particularly in high-output lasers in which the laser medium becomes correspondingly and intensely heated when the laser is operating.

SUMMARY OF THE INVENTION

The invention seeks to provide a laser which is of compact construction which has a high output and which functions reliably.

According to the invention, the partial paths are disposed only radially in relation to a common centre. With this disposition of the partial paths, heat expansion when the laser medium in the partial paths becomes heated, can occur only lengthwise of the partial paths and in any case to a far more negligible extent transversely to the partial paths. The substantially regular extension of all the partial paths which is essentially linked with solely radial heat expansion does not adversely affect the adjustment of the resonator beam.

The radial partial paths can be accommodated in a small space and they form in toto a long effective stimulation path so that on the basis of the partial path configuration according to the invention it is possible to construct a compact and powerful laser which functions reliably.

The partial paths are preferably disposed groupwise in at least one common plane along radii and/or on at least one common envelope of a cone along cone generatrices, the partial paths of the individual groups being disposed at equal angular intervals from one another. In this way, a particularly good radial guidance of any heat expansion is achieved so that angular variations between the partial paths are even more effectively suppressed in order to avoid maladjustment of the resonator beam.

According to a particularly preferred further embodiment of the invention, the partial paths of the individual groups are in each case of the same length and are at the same distance from the centre. This partial path configuration ensures that the variations in length of the partial paths upon radial heat expansion will be substantially the same for all the partial paths, heat expansion crosswise to the partial paths being more effectively suppressed.

The radially outer ends of the partial paths are in particular connected to one another optically via mirrors disposed in pairs and via optical connecting paths extending between the mirrors and transversely to the partial paths. Preferably, it is envisaged that the partial paths be disposed pairwise along a straight line on opposite sides of the centre so that the beam within the resonator crosses the centre several times. A long stimulation path is created with the use of comparatively few mirrors.

According to another embodiment of the invention, the radially inner ends of the partial path pairs are connected to one another optically by at least one deflecting mirror. The result is that the centre is taken out of the resonator beam. In so far as a minimal deviation of the partial paths from their radial pattern can be tolerated, so it is possible for each pair of partial paths to manage with one deflecting mirror disposed close to the centre. Maintenance of the central symmetry of the partial paths is guaranteed when the pairs of partial paths are connected to one another optically via two deflecting mirrors.

According to a preferred development of the invention, the laser is constructed as a gas laser, particularly a $CO_2$ laser and comprises electrodes which are associated with the individual partial paths. The electrodes serve to provide electrical stimulation of the gaseous laser medium.

Preferably there is in the region of the centre a central electrode, particularly a cathode, which is associated jointly with the partial paths. By the use of only one central electrode, construction of the laser is simplified. Furthermore, it is possible to cool the central electrode by simple means. The counter electrodes are provided at the radially outer ends of the partial paths, so that these latter are used over virtually their entire length as gas stimulation paths or gas discharge paths.

The central electrode is in particular constructed as a component which can be exchanged under operating conditions, which makes the laser particularly maintenance-friendly. This is particularly important if the central electrode is constructed as a cathode and is therefore, by virtue of sputter effects, possibly subject to increased wear and tear.

The partial paths expediently extend in tubes in which the gaseous laser medium is able to flow along the tube axes and which, in the region of the centre, discharge into a common chamber and are at their radially outer ends connected to a gas recycling means connected to the chamber. In this way, a closed gas circuit is established in which the gas constantly circulates and is cooled in the gas circulating arrangement.

The components of the stimulation path can thus be maintained at a comparatively low temperature so that heat expansion and the resultant displacements of the beam components are minimised. Gas cooling is particularly important for a $CO_2$ laser, since the $CO_2$ laser medium decomposes at relatively high temperatures or the lower laser levels of $CO_2$ become thermally occupied at relatively high temperatures, resulting in a reduction in laser efficiency.

Also advantageous is the conduct of gas along the tube axes particularly from the relevant outer electrode to the central electrode. For example in the case of a $CO_2$ laser, such geometry permits a substantially undisturbed $TEM_{00}$ radiation mode which is characterised by an even bell-shaped distribution of intensity over the beam cross-section. This $TEM_{00}$ mode permits of an extremely small focal point of the laser beam with a correspondingly high energy density which is very important in the machining of material.

The aforementioned embodiment furthermore permits of a very efficient gas exchange, the flow velocity of the gas being substantially the same in all the tubes.

According to a further development of the invention, the gas circulating means comprises, for passing the gas through the gas tubes and the gas circulating means, a turbine which is in particular so disposed that its axis of rotation extends at a right-angle through the centre of the plane of disposition of the partial paths or equiaxially in respect of the cone representing the disposition of the partial paths. On the one hand, the turbine can pass large quantities of gas without creating any surges which would be unavoidable, for instance, with conventional pumps. The direction of flow is preferably so chosen that the gas leaves the partial paths through the central chamber and enters them again at the radially outer ends of the partial paths. The central disposition of the turbine serves inter alia to ensure that the gas flowing back into the partial paths at the radially outer ends thereof is at substantially the same temperature at all the partial path ends, care being taken to ensure that the lines leading to the turbine from the radially outer ends of the partial paths are of substantially the same length and are as far as possible disposed symmetrically in relation to their relevant axis.

A particularly efficient gas cooling is achieved by heat exchange media in the gas flow direction before and after the turbine.

In a preferred further development of the invention, the chamber has a removable cover which constitutes the central electrode. If required, the central electrode can be easily and quickly changed.

One embodiment of the invention is characterised in that the partial paths extend in one common plane and in that the carrier is constructed as a housing which is substantially rotationally symmetrical with an axis extending at right-angles to the plane through the centre, the housing consisting of a shell carrying the components of the stimulating path and a housing cover adjacent the edge of the shell and undercut around the periphery. Due to the symmetry of the carrier in conjunction with the symmetry of the partial paths, heat expansions in the system as a whole are almost entirely prevented crosswise to the partial paths. The housing cover stabilises the shell and helps to limit expansion along the partial paths.

For still farther-reaching stabilising of the housing and the avoidance of heat expansion, shell and cover are preferably made from carbon reinforced synthetic plastics and are provided with integrally moulded and particularly radially extending ribs. The carbon reinforced synthetic plastics material has a very low heat expansion coefficient.

The shell is supported on a carrying table through rubber-elastic elements which absorb external vibrations, equalise out any tension and have a temperature insulating action so that the temperature distribution symmetry of the laser is not upset by external influences.

In order to form coolant passages, the shell and/or the cover may be of double-walled construction.

To compensate for the temperature of the air inside the housing, it is in particular possible to dispose a fan on the cover and inside the housing to circulate the air within the housing. Furthermore, additional water cooling may be provided, for example with cooling coils or cooling tubes supported on the cover and inside the housing.

For a particularly accurate beam centring and adjustment, it is suggested that each deflecting mirror have a base part to be fixed on the carrier and a mirror carrier adapted for movement in relation to the base part and provided with a mirrored surface and which, by means of a spring arrangement, can be pretensioned in respect of the base part and braced on the said base part through three longitudinally-adjustable bracing members which are disposed in a triangle, the bracing members being supported on the base part or the mirror carrier, their free ends engaging keyways in the other part, two keyways extending parallel with each other while the third extends transversely to the parallel grooves.

This deflecting mirror is also capable of being used for other laser and other optical systems and to this extent it has an independent significance.

The bracing members are preferably constructed as set-screws which are screwed into the mirror carrier.

Two of the grooves are in particular disposed one behind the other along a straight line, whereas the third groove extends at a right-angle to the other two grooves.

Preferably, the spring arrangement is constructed from draw springs connected at one end to the base part and at the other to the mirror carrier and they are in particular disposed in the vicinity of the bracing members. The mirror carrier can thus enjoy versatile and accurate The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
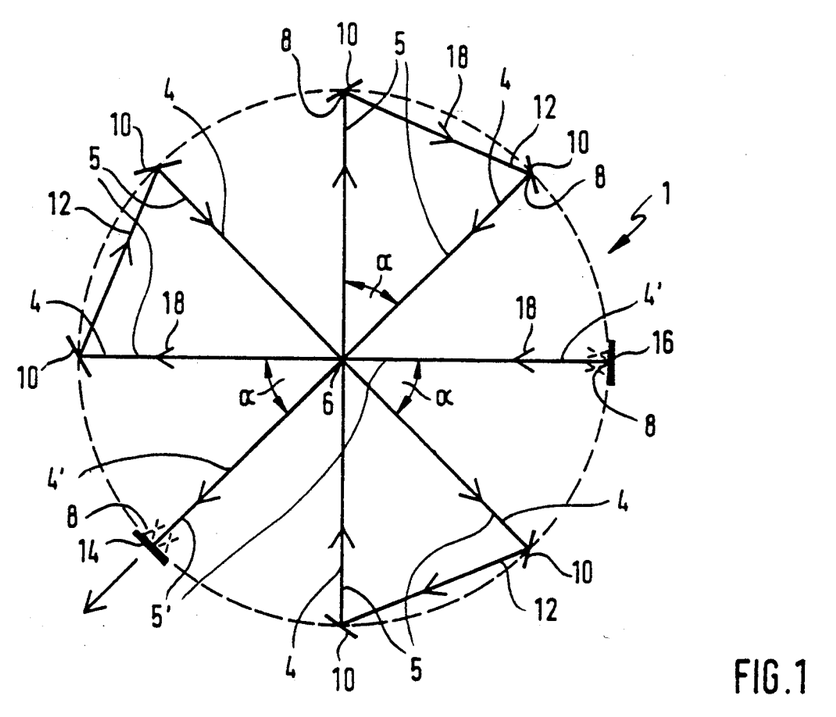
FIG. 1 is a diagrammatic view of a first configuration of partial paths and optical connecting paths in a resonator arrangement according to the invention, in plan view.

FIG. 1 diagrammatically shows a first example of a laser resonator arrangement 1. The resonator arrangement 1 comprises a group of partial paths 4, 4' extending in one plane and disposed solely radially in relation to a centre 6 and they are all of equal length and are at equal angular distances $\alpha$ from one another. The radially outer ends 8 of three pairs of partial paths 5 are optically connected to one another via pairwise disposed deflecting mirrors 10 and optical connecting paths 12 extending between the deflecting mirrors 10 transversely to the partial paths 4 of the pairs 5 of partial paths. The partial paths 4' of a further pair of partial paths 5' have their radially outer ends 8 adjacent respective mirror faces 14, 16 which form the end mirrors 14, 16 of the resonator 1.

The beam path in the resonator 1 for the beam which is reflected completely at the end mirror 16 is indicated by arrows 18. Starting from the resonator end mirror 16, the beam crosses the centre 6 and passes through two rectilinearly serially disposed partial paths 4, is then deflected by a deflecting mirror 10 along an optical connecting path 12 whereupon, after being further reflected at a deflecting mirror 10 so that it is offset in a clockwise direction by an angular distance $\alpha$, it passes along two further rectilinearly successive partial paths, again crossing the centre 6. This scheme of fold is continued until the beam reaches the partially beam-impervious resonator end mirror 14.

Stimulation of a laser medium occurs only in the region of the partial paths 4, 4' and not in the region of the optical connecting paths 12. As a result, the heat expansion of resonator and housing components resulting from heating during laser stimulation will extend substantially radially so that the angular intervals $\alpha$, if they do alter, will do so to such a minor degree that there is no notable maladjustment of the resonator beam.

Further examples according to the invention are described hereinafter. Parts or paths in these further examples which in terms of their functioning have a counterpart in the previously explained resonator arrangement, are identified by the same corresponding reference numeral, followed by a letter. The description of these further examples relates substantially to deviations from the previously explained example.

Figure 2:
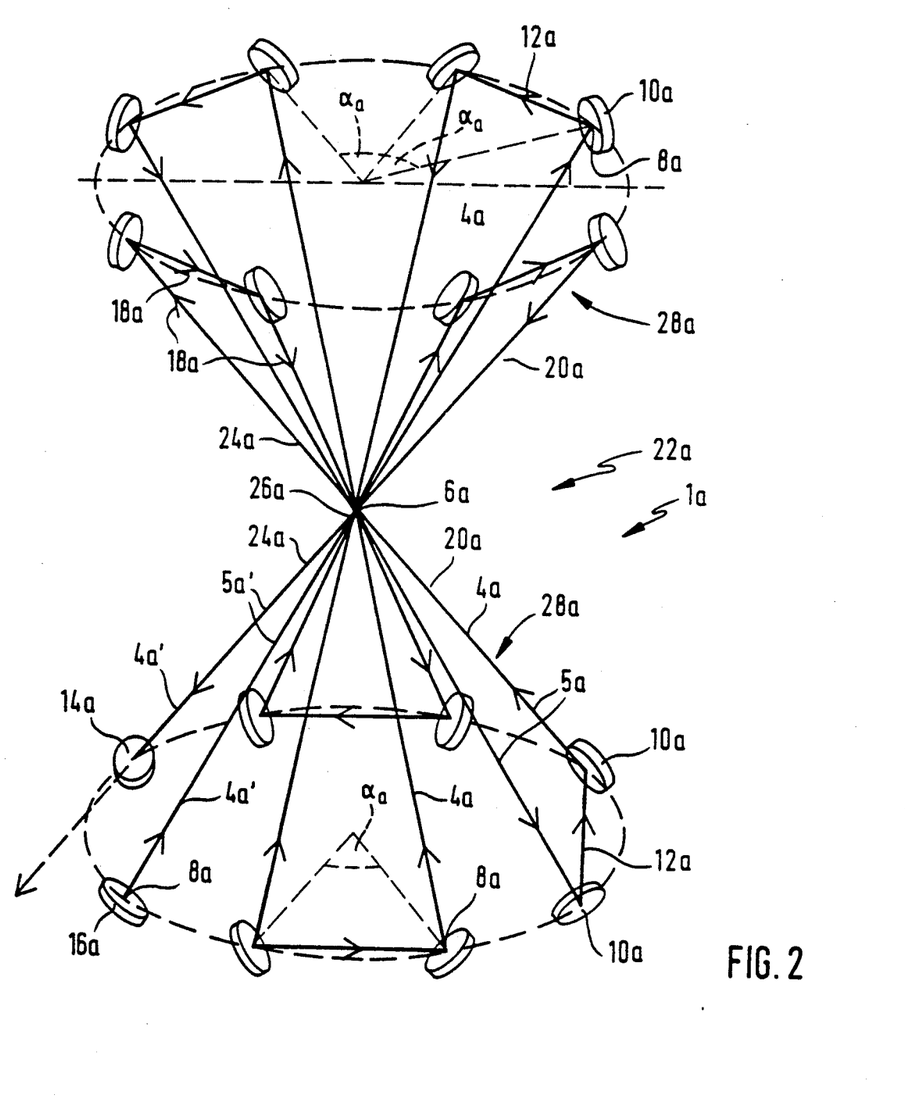
FIG. 2 is a diagrammatic perspective view of a second configuration of partial paths and optical connecting paths of a resonator arrangement according to the invention.

The equally long partial paths 4a, 4a' are disposed on the shell 20a of a rotationally symmetrical double cone 22a along cone generatrices 24a. The cone tips 26a of the equally sized single cones 28a which form the double cone 22a touch each other at a centre 6a. The (in relation to pairs 5a are connected to one another optically via mirrors 10a disposed in pairs at the base periphery of the single cones 28a and optical connecting paths 12a which extend between the mirrors 10a and crosswise to the partial paths 4a. The partial paths 4a, 4a' are on both individual cones 28a at each angular distances $\alpha_a$ from one another.

A partial path 4a' of a further pair 5a' of partial paths has its radially outer end 8a adjacent a completely beam reflecting resonator end mirror 16a and the other partial path of the partial path pair 5a has its radially outer end 8a adjacent a partially permeable resonator end mirror 14a for radiation balancing. Within the resonator, the pattern of the beam reflected at the resonator end mirror 16a is indicated by arrows 18a. In a similar way to the previously described resonator arrangement, the beam passes through the centre 6a several times on its way from the end mirror 16a to the partially permeable balancing mirror 14a and in the interim it passes along the equally long optical connecting paths 12a.

In the resonator arrangement shown in FIG. 2, an overall particularly long stimulation path comprising exclusively radial partial paths 4a, 4a' can be accommodated in a comparative small space.

Figure 3:
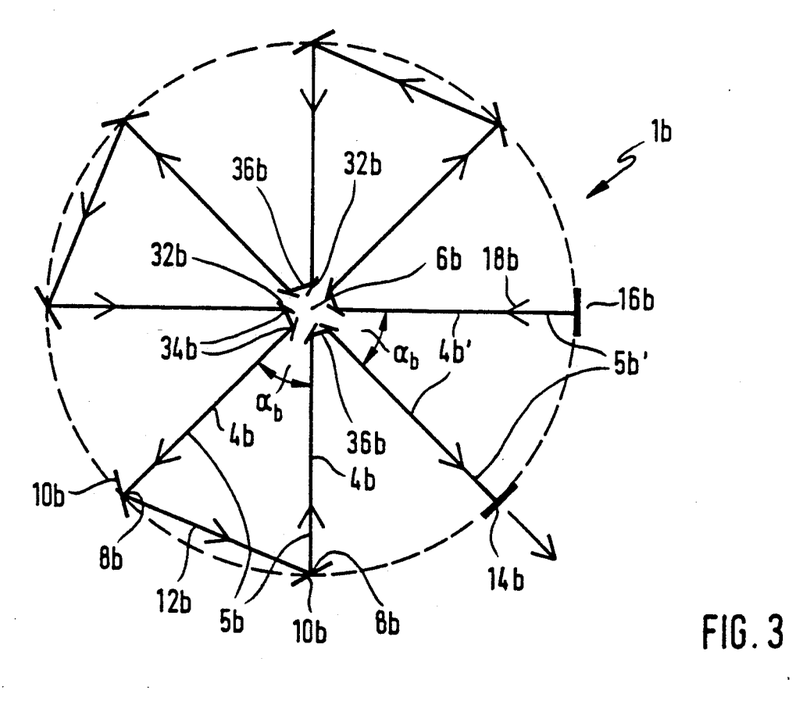
FIG. 3 is a diagrammatic view of a third configuration of partial paths and optical connecting paths of a resonator arrangement according to the invention, in plan view.

The resonator arrangement shown in FIG. 3 will be explained hereinafter. In the case of this third example, the partial paths 4b, 4b' lie in one plane and extend radially in relation to a centre 6b. The partial paths 4b are of the same length, are at the same angular distance $\alpha_b$ from one another and are at the same distance from the centre 6b. In addition to the mirrors 10b at the radially outer ends 8b of the partial paths 4b, mirrors 32b are provided at the radially inner ends 34b of the partial paths 4b which conduct the beam in the vicinity of the centre 6b along inner connecting paths 36b from one pair 5b to the next partial path pair.

The pattern of the laser beam inside the resonator and reflected at the completely reflecting resonator end mirror is shown by the arrows 18b. A resonator arrangement according to FIG. 3 can, for example, be expedient if the centre 6b has to be kept clear, for example for supporting means.

If slight deviations from the radial pattern of the partial paths 4b, 4b' are tolerated, then the pairwisely co-operating mirrors 32b can in each case be replaced by one mirror. In this case, the inner connecting paths 36b are unnecessary.

Figure 4:
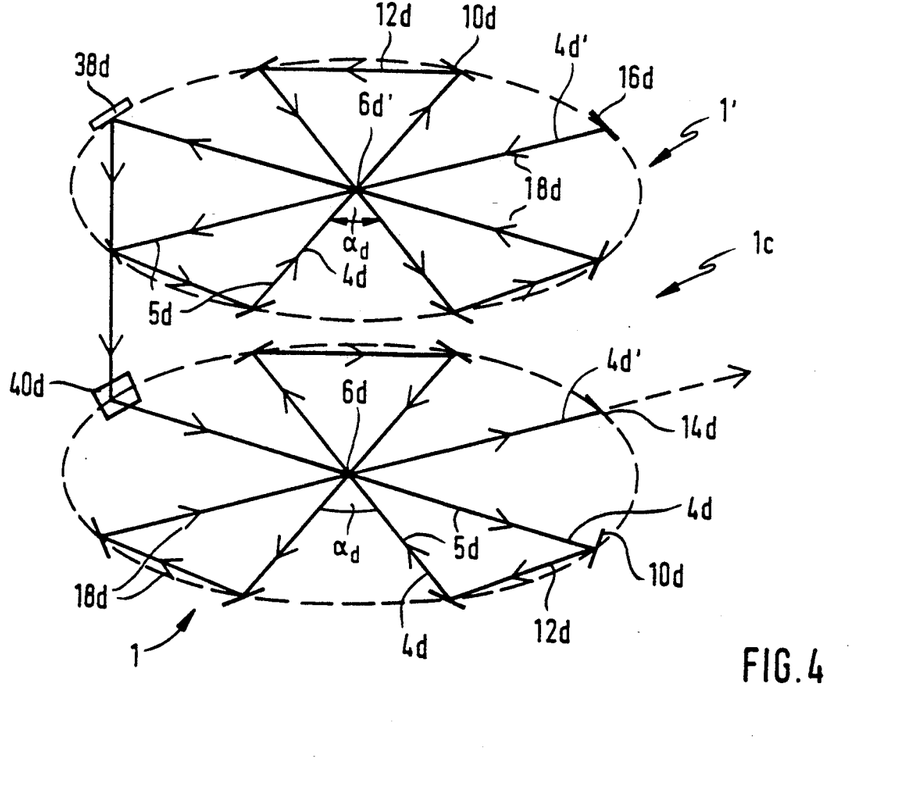
FIG. 4 is a diagrammatic perspective view of a fourth configuration of partial paths and optical connecting paths of a resonator arrangement according to the invention.

FIG. 4 shows a resonator arrangement 1c consisting of two coaxially superimposed resonator configurations 1, 1' of the type shown in FIG. 1, and of which the partial paths 4d, when viewed from above, are caused to coincide with one another. Instead of a partially permeable end mirror, the upper resonator configuration 1' has a deflecting mirror 38d which reflects the laser beam at right-angles to the lower resonator configuration 1. Instead of the completely reflecting end mirror, the lower resonator configuration 1 has a deflecting mirror 40d feeding the radiation reflected by the deflecting mirror 38d into the lower resonator configuration 1.

The example shown in FIG. 4 likewise has a long stimulation path and can be compact in construction. It goes without saying that also a plurality of and different resonator configurations can be coupled to one another in the manner shown in FIG. 4.

Figure 5:
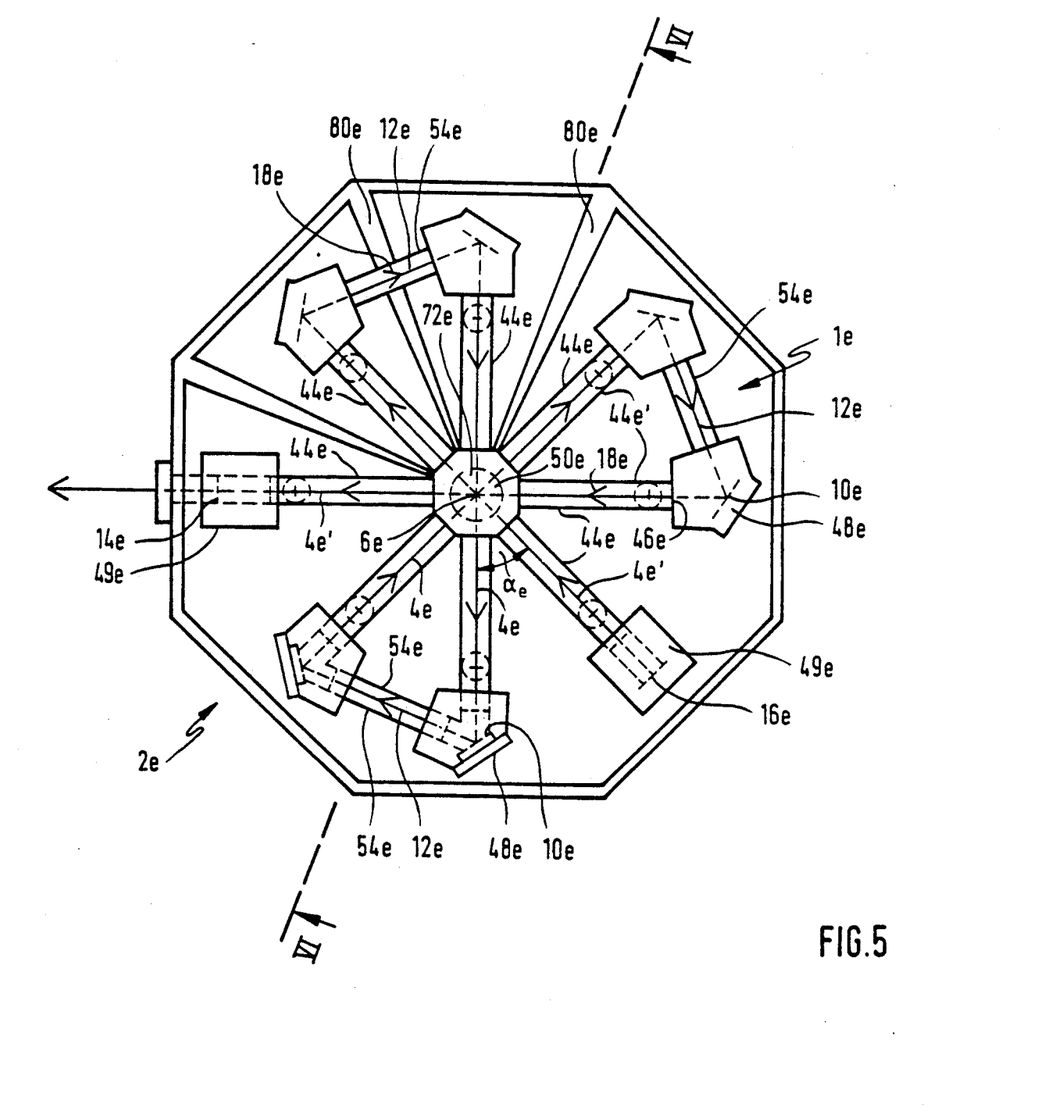
FIG. 5 shows a $CO_2$ gas laser according to the invention, in plan view and with the housing cover removed.
Figure 6:
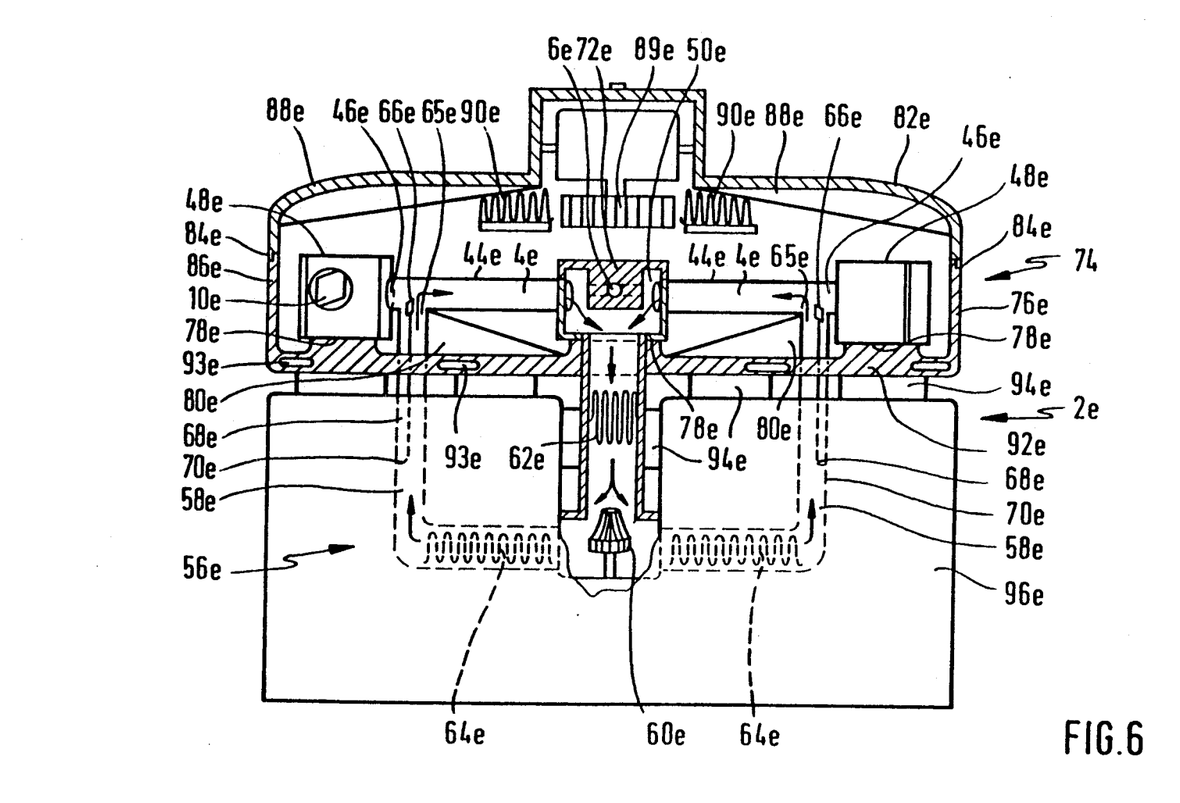
FIG. 6 is a sectional side view of the laser shown in FIG. 5, the section being taken on the line VI—VI in FIG. 5.

FIGS. 5 and 6 shows a preferred embodiment of the invention. This is a $CO_2$ gas laser 2e with a resonator arrangement 1e corresponding to the resonator arrangement 1 already explained with reference to FIG. 1.

The partial paths 4e, 4e' extend in first gas tubes 44e of which the radially outer ends 46e open out into outwardly sealed mirror chambers 48e and 49e which contain the mirrors 10e or 14e, 16e while their radially inner ends open out into a common extraction chamber 50e. Second gas tubes 54e enclose the optical connecting paths 12e and, via mirror boxes 48e, they connect pairs 44e' of first tubes 44e to one another. The tubes 44e, 54e may consist of heat resistant glass, for example.

The extraction chamber 50e is rotationally symmetrical. Its axis extends at a right-angle to the plane of the paths 4e, 4e' through the centre 6e. The extraction chamber is connected to a gas circulating means 56e which sucks the gas out of the tubes 44e through the extraction chamber 50e, passing it back into the tubes 44e through silicon feed lines 58e which are connected close to the radially outer ends 46e of the tubes 44e. The circulating means 56e are constructed substantially symmetrically in relation to an axis extending through the centre 6e of the plane in which the partial paths 4e are disposed and it comprises a turbine 60e which delivers a rapid and even flow of gas through the first tubes 44e, the chamber 50e and the circulating means 56e. The circulating means 56e furthermore comprises the gas lines 58e for returning the gas to the first tubes 44e, a turbine chamber 61e adjacent the extraction chamber 50e and heat exchangers 62e, 64e for gas cooling and disposed before and after the turbine 60e in the direction of gas flow. By virtue of the symmetrical construction of the circulating means 56e, care is taken that gas fed to the first gas tubes 44e arrives at all the radially outer ends 46e of the first gas tubes 44e as far as possible at the same temperature and at the same flow velocity.

At the points of connection 65e of the gas supply lines 58e to the first gas tubes 44e, anodes 66e are disposed in the gas tubes 44e, the electrical connections 68e of which are passed outwards through gas-tight bushings 70e in the feed lines 58e. Associated with the anodes 66e is a common cathode 72e disposed on the region of the centre 6e and constituted by a chamber cover 72e which in a gastight fashion seals the extraction chamber 50e.

The cathode 72e can be interchanged under operating conditions, which benefits the maintenance-friendliness of the laser according to the invention.

Anodes 66e and cathode 72e enclose between them gas discharge paths or gas stimulating paths for laser stimulation and which are traversed axially by the laser active gas. With such a laser geometry, it is possible to obtain a substantially undisturbed $TEM_{00}$ laser mode with an extremely high energy density in the centre of the laser beam cross-section.

The laser has a substantially rotationally symmetrical housing 74e, the axis of which extends at a right-angle to the plane of the partial paths 4e through the centre 6e. The housing 74e comprises a bottom shell 76e which supports in its interior the mirror chambers 48e, 49e and the extraction pot 50e on supporting surfaces 78e which lie in one common plane.

The shell 76e comprises integrally moulded radial stiffening ribs 80e disposed at identical angular distances from one another. FIG. 5 shows three of the altogether eight stiffening ribs 80e.

The housing 74e furthermore comprises a housing cover 82e which has a peripheral undercut 84e adjacent the rim of the shell 76e. In this way, the cover 82e counteracts radial expansions of the shell 76e. The cover comprises radial stiffening ribs 88e which are disposed at identical angular distances from one another. Disposed centrally within the housing 74e and on the cover 82e is a fan 89e which ventilates the air within the housing. Close to the fan there are cooling coils.-90 for cooling the air inside the housing.

A further cooling measure is provided whereby the bottom 92e of the shell 76e comprises coolant passages 93e which are disposed substantially concentrically of the axis extending through the centre 6e at right-angles to the plane of the partial paths 4e.

The housing 74e is made from a carbon fibre reinforced synthetic plastics material. This material has a very low heat expansion coefficient.

To avoid shocks or transmission of vibrations to the housing 74e, the shell 76e is supported on a table 96e through rubber-elastic elements 94e.

The $CO_2$ gas laser explained hereinabove is, all in all, substantially symmetrical in relation to an axis extending through the centre at right-angles to the plane of the partial paths 4e, the $CO_2$ laser medium which acts as a heat source and all the heat sinks being distributed substantially symmetrically in relation to this axis. In particular, there is no heating of the gas in the optical transmission paths 12e which extend at right-angles to the partial paths 4e, 4e', since these paths are not disposed in the range of action of the gas-stimulating electrodes. In relation to the above-mentioned central axis, there is a symmetrical distribution of temperature in the laser so that heat expansions in the laser transversely to the partial paths are substantially suppressed and in this way maladjustment of the resonator beam can be avoided. The mechanical construction of the housing and the housing material are furthermore such that heat expansion as a whole, in other words also radial heat expansion can be largely prevented. The circulating means 56e and the other cooling measures prevent major differences in temperature in the laser. For compact overall dimensions, the laser has a high level of output since there is an altogether long stimulation path, it is very compact since the stimulation path is divided into a plurality of partial paths in a small space and it works very reliably since the gaseous laser medium is constantly and efficiently cooled and since, furthermore, self-maladjustment is prevented by the measures already referred to in connection with the problems of heat expansion.

One of the mirror chambers 48f of the laser according to the invention is explained in greater detail with reference to FIGS. 7 and 8.

Figure 7:
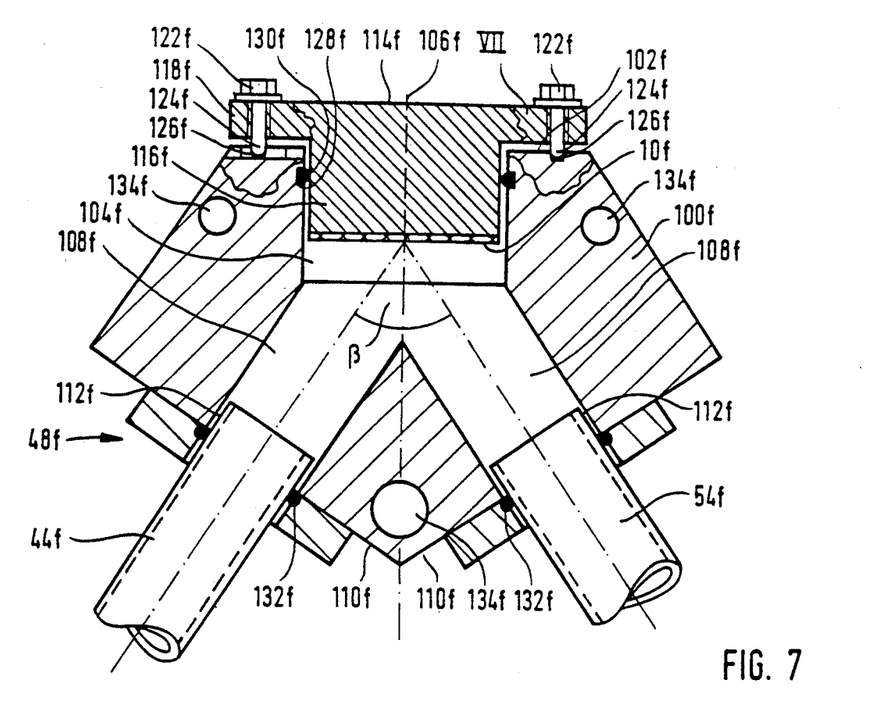
FIG. 7 is a sectional view of a mirror box according to the invention in plan view, the section being taken on the line VII—VII in FIG. 8 and comprising broken-away parts which render partially visible a plane extending on the line VII—VII through two keyways.

FIG. 7 shows the mirror chamber 48f in a sectional view. The mirror chamber 48f comprises a base part 100f with a back wall 102f and, formed into the back wall 102f, a cylindrical mirror shaft 104f, the axis 106f of which extends at a right-angle to the rear wall 102f and which is connected to two tube connecting passages 108f which emerge from the mirror shaft 104f at an angle β and symmetrically in relation to a vertical plane extending lengthwise of the axis 106f of the mirror shaft 104f and which extend through the base part 100f substantially horizontally in a direction away from the rear wall 102f, forming on the front 110f of the base part 100f connections 112f for gas tubes 44f, 54f.

Disposed on the back 102f of the base part 100f is a mirror carrier 114f comprising, inserted into the mirror shaft 104f, a cylindrical portion 116f with, forming the deflecting mirror 10f, a mirrored front face 10f and, masking the back 102f of the base part 100f, a widened supporting portion 118f. By means of springs 120f, the mirror carrier 114f is pre-tensioned towards the base part 100f and is braced on the back 102f of the base part 100f by three setscrews 122f which are screwed through the prepared supporting portion 118f and which are disposed in a triangular arrangement.

Figure 8:
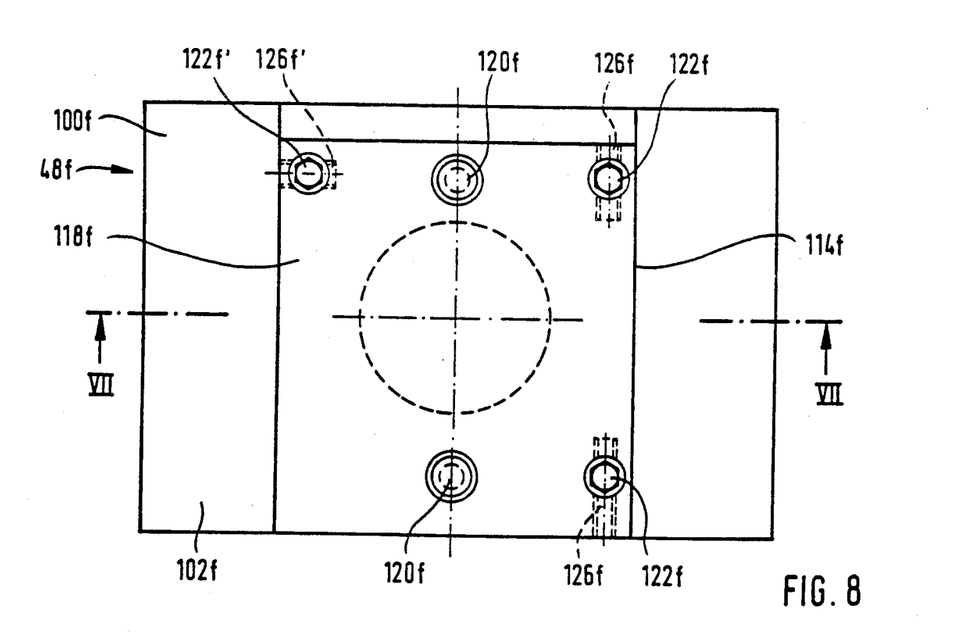
FIG. 8 is a view of the back of the mirror box shown in FIG. 7.

The triangular arrangement of the setscrews 122f is shown in FIG. 8. The setscrews 122f have at their ends which are braced on the base part 100f ball cups 124f which engage keyways 126f, 126f' in the base part 100f. Two of the keyways 126f on the back 102f of the base part 100f extend in a straight direction one after the other and the keyway 126f' extends at a right-angle to the other two. In order to adjust the deflecting mirror 10f, the setscrews 122f can be adjusted so that the deflecting mirror 10f is displaced axially in the mirror shaft 104f and furthermore can be tilted in relation to the axis of the mirror shaft 104f about two tilting axes which extend at right-angles to each other. At each tilting of the mirror carrier 114f about the axes, the ball cups 124f of the setscrews 122f are able to perform compensating movements in the keyways 126f, 126f', so that during tilting, no stress occurs between the mirror carrier 114f and the base part 100f. A rotation of the mirror carrier 114f about the axis 106f of the mirror shaft 104f does not take place during the adjusting movements. Adjustment of the mirror 10f is thus very simple and precise.

The cylindrical portion 116f of the mirror carrier 114f has a slightly smaller diameter than the mirror shaft 104f so that for tilting movement..s of the mirror carrier 114f there is sufficient clearance between the shell of the cylindrical portion 116f and the periphery of the mirror shaft 104f.

An O-ring 130f disposed in an annular groove 128f in the base part 100f about the cylindrical portion 116f provides an outwardly gas-tight seal for the mirror shaft 104f. Further O-rings 132f form seals between the tube connecting passages 108f and the gas tubes 44f, 54f which are connected to them.

The screw holes 134f shown in FIG. 7 serve to convey screws for fixing the base part 100f to a retaining surface of the laser housing.

While specific embodiments of the invention have been shown and described in detail to illustrate the application of the inventive principles, it will be understood that the invention may be embodied otherwise without departing from such principles.

What I claim is:

1. A laser comprising a resonator having end mirrors such that an optical stimulating path for stimulation of a laser medium resides therebetween, the stimulating path being subdivided into a plurality of partial paths (4) and a plurality of optical connecting paths (12) connecting the partial paths (4) to one another, said partial paths (4) being disposed solely radially in relation to a common centre point (6) located within the resonator, wherein the partial paths (4) are disposed to form individual groups in at least one common plane along radii extending from the centre point (6), and the partial paths (4) of the individual groups are disposed at equal angular intervals from one another, with each partial path (4) having each the same length and being the same radial distance from the centre point (6), and each partial path (4) having radially outer and inner ends, the radially outer ends being connected optically to one another via mirrors (10) disposed in pairs for each individual group and via optical connecting paths (12) which extend between the mirrors (10) and transversely to the partial paths (4).

2. A laser according to claim 1, wherein the radially inner ends of partial path pairs (4b) are adjacent in circumferential direction to one another and optically connected to one another via at least one deflecting mirror (32b).

3. A laser according to claim 1, wherein the laser is a gas laser having means for exciting a gas and further comprises electrodes (66e, 72e) having individual partial paths (4e) of the optical stimulating path residing therebetween, the individual partial paths (4e) being disposed radially in relation to a common centre point (6e) located within the resonator wherein in the region of the centre point (6e) there is a central electrode (72e) which is intersected by all of the individual partial paths (4e).

4. A laser according to claim 3, wherein the central electrode (72e) comprises means for removal and replacement of central electrode (72e) from extraction chamber (50e) during operation of the laser.

5. A laser according to claim 3, in which the central electrode (72e) is a cathode.

6. A laser according to claim 1, wherein the laser is a gas laser having means for exciting a gas and further comprises electrodes (66e, 72e) having individual partial paths (4e) of the optical stimulating path residing therebetween, the individual partial paths being disposed radially in relation to a common centre point (6e) located within the resonator, and the partial paths (4e) extend in gas tubes (44e) which in the region of the centre point (6e) are introduced into a common chamber (50e) and which in the region of their radially outer ends are connected to gas circulating means (56e) connected to the chamber (50e).

7. A laser according to claim 6, wherein the gas circulating means (56e) comprises a turbine (60e) which delivers the gas through the gas tubes (44e) and the gas circulating means.

8. A laser according to claim 7, wherein the turbine (60e) has an axis of rotation which extends at a right-angle through the centre point (6e) of the plane in which are disposed the partial paths (4e).

9. A laser according to claim 7, in which turbine (60e) has an axis of rotation which extends along the same axis as a cone (28a) defined by partial paths (4a) making up the optical stimulating path.

10. A laser according to claim 6, wherein the gas circulating means (46e) comprises heat exchange means (62e, 64e) in the direction of gas flow located upstream, downstream, or a combination thereof in relation to the turbine (60e).

11. A laser according to claim 6, wherein the chamber (50e) has a removable cover (72e) which forms the central electrode (72e).

12. A laser according to claim 1, wherein the partial paths (4e) extend in a common plane and wherein a carrier (76e, 82e) being constructed as a housing (74e) is provided, said housing (74e) being substantially rotationally symmetrical in respect of an axis extending at a right angle to the plane through the center (6e) and consisting of a stimulating path and a housing cover (82e) which has a peripheral undercut (84e) adjacent a rim (86e) of the shell.

13. A laser according to claim 12, wherein the shell (73e) and the cover (82e) consists of carbon fibre reinforced synthetic plastics material and have integrally moulded ribs.

14. A laser according to claim 12, wherein the shell (76e) is supported on a table (96e) through rubber elastic elements (94e).

15. A laser according to claim 12, wherein the shell (76e) is of double walled construction in order to form coolant passages which are disposed substantially concentrically in relation to an axis extending through centre point (6e) perpendicular to the plane in which the partial paths (4e) reside.

16. A laser, according to one of claims 12-15, wherein a fan (89e) is disposed in the centre of the cover (82e), within the housing (74e)

17. A laser according to claim 12, in which the cover 82(e) is of double walled construction in order to form coolant passages.

18. A laser according to claim 12, in which the shell (76e) and the cover (82e) have integrally moulded radially extending ribs (80e, 88e).

19. A laser according to claim 1, in which the optical connecting paths (12) connect the partial paths (4) to one another by means of deflecting mirrors (10).

20. A laser according to claim 1, in which the partial paths (4) are disposed groupwise along cone generatrices (24a) defining a cone (20a), wherein the generatrices intersect at a centre point (6a) which defines the tip of the cone (20a).

21. A laser, comprising a resonator having end mirrors such that an optical stimulating path for stimulation of a laser medium resides therebetween the stimulating path being subdivided into a plurality of partial paths (4) connected to one another via deflecting mirrors, said partial paths (4) being disposed solely radially in relation to a common centre point located within the resonator, wherein the partial paths (4) are disposed to form individual groups in at least one common plane along radii extending from the centre point, wherein each deflecting mirror comprises a base part (100f) having a back wall (102f) and a cylindrical mirror shaft (104f), the base part being fixed to a carrier 74(e) of said partial paths and a mirror carrier (114f) comprising a cylindrical portion (116f) inserted into the mirror shaft (104f) and provided with a mirror surface (10f), the mirror carrier (114f) being adapted for movement in relation to the base part (100f) by a spring arrangement (120f) which pretensions mirror carrier (114f) towards base part (100f), the mirror carrier (114f) being supported on the base part (100f) via three longitudinally adjustable bracing members (122f) which are disposed in a triangular arrangement, the bracing members (122f) having free ends and being supported on the base part (100f), the free ends (124f) engaging keyways (126f, 126f') in the base part (100f), with the base part (100f) having first and second grooves (126f) extending parallel with each other while a third groove (126f') extends transversely of the first and second grooves (126f).

22. A laser according to claim 1, wherein the bracing members (122f) are constructed as set-screws which are screwed into the mirror carrier (114f).

23. A laser according to claim 21, wherein the first and second grooves (126f) are disposed on after another in a straight line, while the third groove (126') extends at a right-angle to the first and second grooves.

24. A laser according to claim 21, wherein the spring arrangement (120f) comprises draw springs connected at one end to the base part (100f) and at the other to the mirror carrier (114f).

25. A laser according to claim 24, in which the draw springs are disposed close to the bracing members (122f).

26. A laser according to claim 21, in which the bracing members (122f) are supported on the mirror carrier (114f).

* * * * *

UNITED STATES PATENT AND TRADEMARK OFFICE
CERTIFICATE OF CORRECTION

PATENT NO.  : 5,113,408
DATED       : May 12, 1992
INVENTOR(S) : Bihler

It is certified that error appears in the above-identified patent and that said Letters Patent is hereby corrected as shown below:

Col. 6, line 6, "relation to" should read --relation to the centre 6a) radially outer ends 8as of partial path--.
Col. 7, line 18, "paths" should read --partial paths--.
Col. 10, line 66, after "of a" insert --shell (76e) carrying the components of the--. Col. 11, line 2, "(73e)" should read --(76e)--; line 33, insert a comma after "therebetween".
Col. 12, line 22, "claim 1" should read --claim 21--.

Signed and Sealed this

Third Day of August, 1993

Attest:

MICHAEL K. KIRK

*Attesting Officer*    Acting Commissioner of Patents and Trademarks